(12) United States Patent
Cheng

(10) Patent No.: US 7,836,822 B2
(45) Date of Patent: Nov. 23, 2010

(54) FOOD CUTTING DEVICE

(75) Inventor: Hilda Hei Yuk Cheng, Hong Kong (CN)

(73) Assignee: Kwok Kuen So, Kowloon, Hong Kong SAR (CN)

( * ) Notice: Subject to any disclaimer, the term of this patent is extended or adjusted under 35 U.S.C. 154(b) by 137 days.

(21) Appl. No.: 12/031,802

(22) Filed: Feb. 15, 2008

(65) Prior Publication Data

US 2009/0205514 A1 Aug. 20, 2009

(51) Int. Cl.
*A23N 4/12* (2006.01)
*B26D 1/00* (2006.01)
*B26D 1/03* (2006.01)

(52) U.S. Cl. ............................ 99/565; 83/857; 83/30; 83/114

(58) Field of Classification Search .................. 99/565, 99/537; 83/857, 13; 30/114, 301, 302, 303, 30/315, 316
See application file for complete search history.

(56) References Cited

U.S. PATENT DOCUMENTS

| 2,297,177 | A | | 9/1942 | Tiffany |
| 5,457,888 | A | * | 10/1995 | Lin ............................ 30/113.3 |
| 7,266,894 | B1 | * | 9/2007 | Hinckley ..................... 30/302 |
| 2006/0011027 | A1 | | 1/2006 | Chan et al. |

FOREIGN PATENT DOCUMENTS

| CH | 273904 A | | 3/1951 |
| WO | WO 02/068159 A1 | | 9/2002 |
| WO | WO 02068159 A1 | * | 9/2002 |

* cited by examiner

*Primary Examiner*—Tu B Hoang
*Assistant Examiner*—Jianying Atkisson
(74) *Attorney, Agent, or Firm*—Leydig, Voit & Mayer, Ltd.

(57) ABSTRACT

A food cutting device has a body frame defining an aperture, and a cutter removably located within the aperture. The body frame has a first engaging formation and the cutter has a second engaging formation adjacent and releasably engageable with the first engaging formation for connecting the cutter to the body frame to produce a unitary structure for a cutting operation.

8 Claims, 5 Drawing Sheets

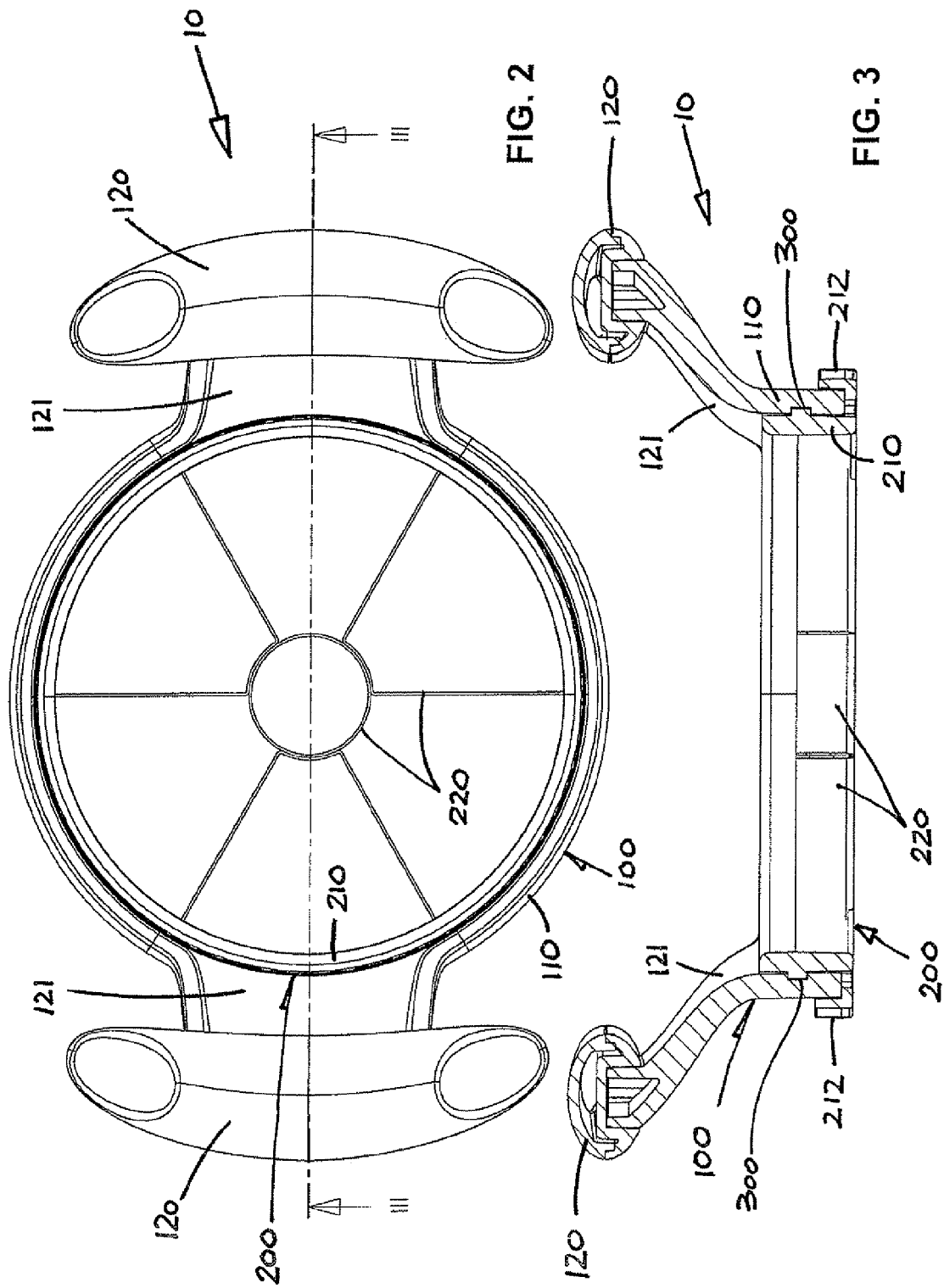

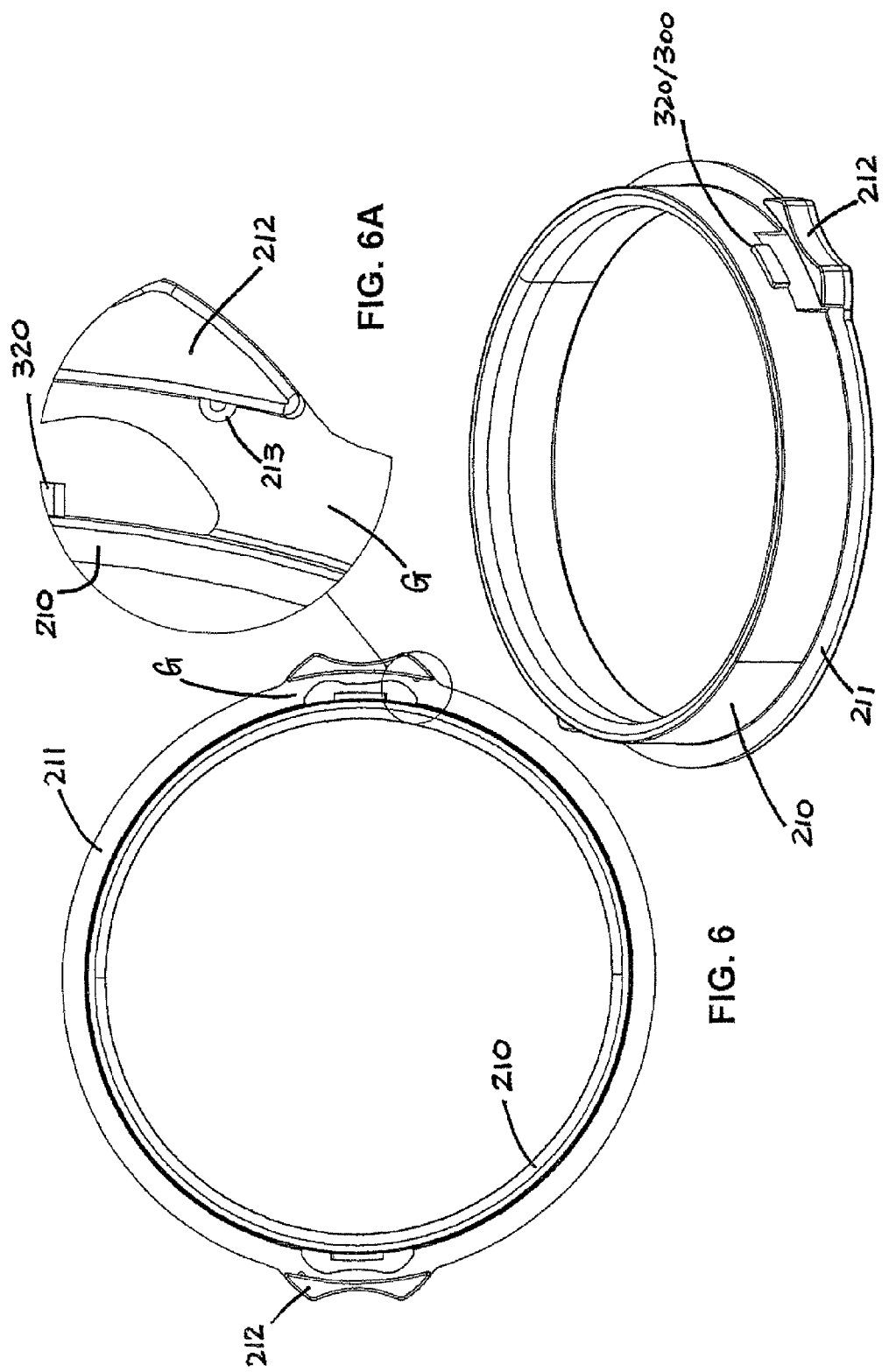

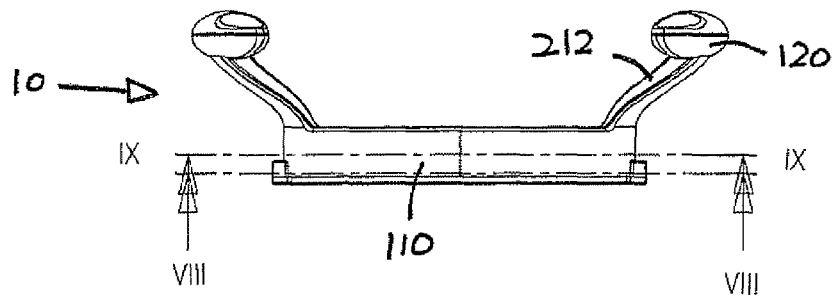
FIG. 7
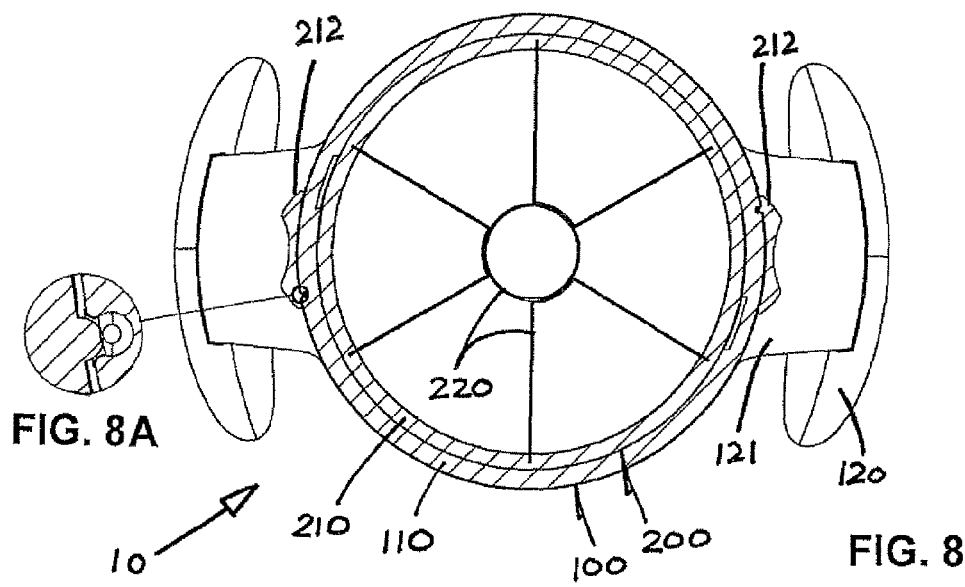
FIG. 8A
FIG. 8
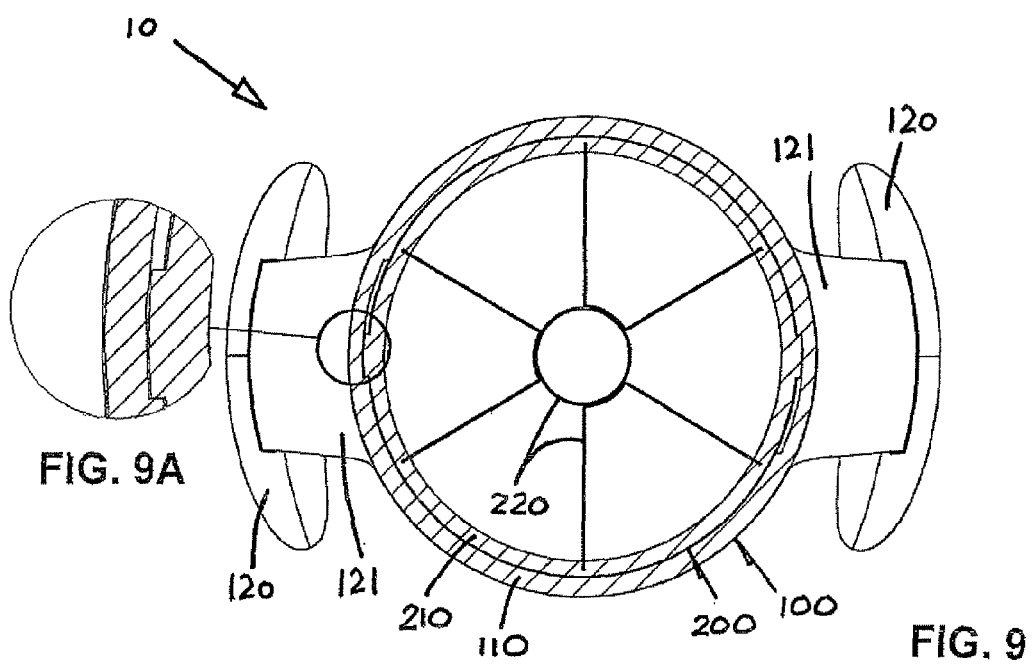
FIG. 9A
FIG. 9 ical (circular) plastic ring 210 and a set of nine stainless
FOOD CUTTING DEVICE The present invention relates to a food cutting device and in particular, but not exclusively, a device for cutting fruit such as an apple slicer.

BACKGROUND OF INVENTION

Food cutting devices of the types concerned are associated with a specific cutting pattern or a pattern in which the cutting blade(s) is arranged. Such patterns are usually fixed.

The invention seeks to obviate or at least alleviate such a problem or shortcoming by providing a new or otherwise improved food cutting device.

SUMMARY OF THE INVENTION

According to the invention, there is provided a food cutting device comprising a body frame defining an aperture therein, and a cutter removably located within the aperture. The body frame includes a first engaging formation and the cutter includes a second engaging formation adjacent and releasably engageable with the first engaging formation for connecting the cutter to the body frame, thereby resulting in a unitary structure for cutting operation.

Preferably, the cutter comprises a plurality of cutting blades, at least some of which extend across the aperture of the body frame and face in substantially the same cutting direction for cutting food in that direction, with said food being cut to pass through the aperture in the opposite direction.

More preferably, the body frame and the cutter are both generally planar and together lie in generally the same imaginary plane perpendicular to the cutting direction.

More preferably, the cutter includes a periphery member which surrounds the cutting blades and to which the cutting blades are fixed, the periphery member being of a marginally smaller size fitting within the aperture and bearing the second engaging formation.

Further more preferably, the body frame and the periphery member of the cutter are both circular.

In a preferred embodiment, the cutter is inserted in said opposite direction into the aperture of the body frame.

In a preferred embodiment, the first and second engaging formations comprise co-operating parts of a bayonet joint.

More preferably, the first engaging formation comprises an L-shaped slot, and the second engaging formation comprises a protrusion releasably engaging the slot.

More preferably, the food cutting device includes two pairs of said first and second engaging formations on opposite sides of the body frame and cutter.

It is preferred that a catch is provided between the body frame and the cutter for holding the cutter against movement relative to the body frame.

It is further preferred that the catch comprises a protuberance on one of the body frame and cutter and a recess in the other of the body frame and cutter, the protuberance and the recess being releasably inter-engageable.

It is preferred that the body frame includes a pair of handles on opposite sides of the body frame.

In a preferred embodiment, the food cutting device includes at least two said cutters which have the same size and the same second engaging formation for interchangeable use with the body frame, removably located within the aperture of the body frame, wherein the cutters have cutting blades arranged in different patterns.

BRIEF DESCRIPTION OF DRAWINGS

The invention will now be more particularly described, by way of example only, with reference to the accompanying drawings, in which:

FIG. 2 is a top plan view of the food cutting device of FIG. 1;

FIG. 3 is a cross-sectional side view of the food cutting device of FIG. 2, taken along line III-III;

FIG. 5 is a perspective view of the cutter (with a cutting blade thereof omitted for simplicity) of FIG. 1;

FIG. 6 is a top plan view of the cutter of FIG. 5;

FIG. 6A is an enlarged view of a part of the cutter of FIG. 6;

FIG. 7 is a side view of the food cutting device of FIG. 1;

FIG. 8 is a cross-sectional bottom view of the food cutting device of FIG. 7, taken along line VIII-VIII;

FIG. 8A is an enlarged view of a part of the food cutting device of FIG. 8;

FIG. 9 is a cross-sectional bottom view of the food cutting device of FIG. 7, taken along line IX-IX; and FIG. 9A is an enlarged view of another part of the food cutting device of FIG. 9.

DETAILED DESCRIPTION OF PREFERRED EMBODIMENT

Figure 1:
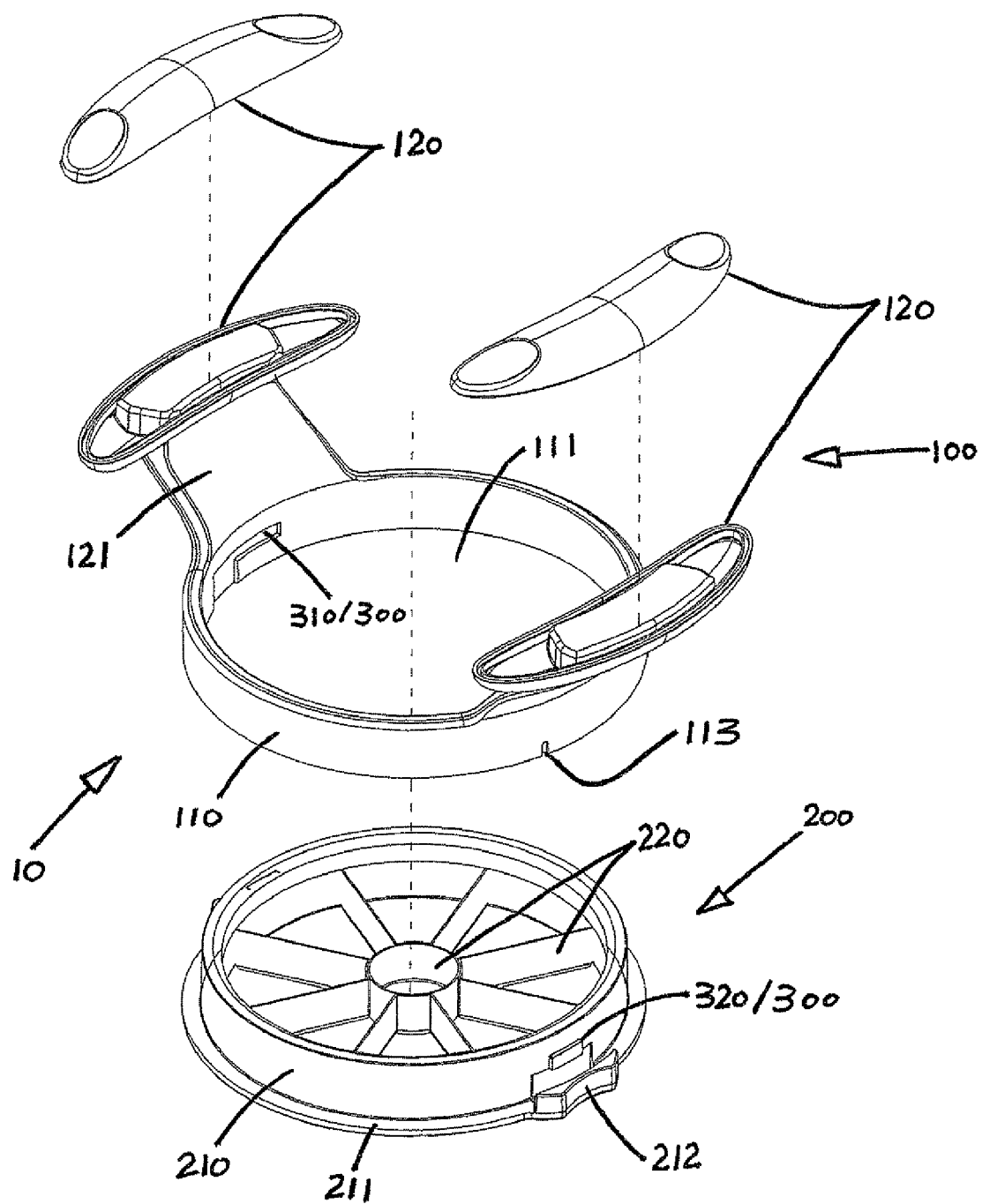
FIG. 1 is an exploded perspective view of an embodiment of a food cutting device in accordance with the invention, having a body frame with handles and a cutter.
Figure 4:
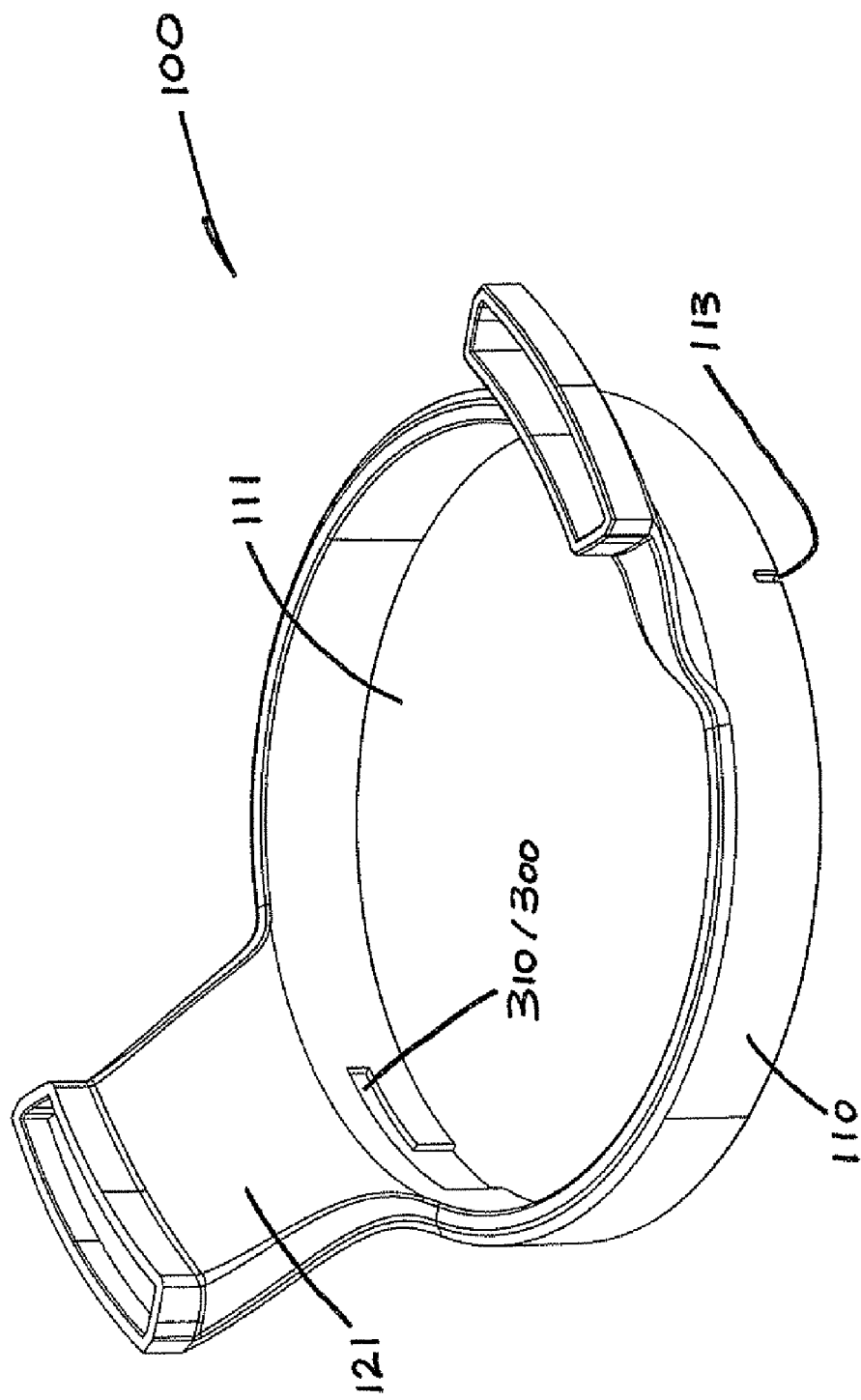
FIG. 4 is a perspective view of the body frame of FIG. 1.

Referring to the drawings, there is shown a food cutting device embodying the invention, in the form of an apple slicer 10 for example, for cutting an apple into slices. The apple slicer 10 is formed by two separate components i.e. a body frame 100 and a cutter 200 which is normally fitted within the body frame 100 and may be detached for washing or replacement by another cutter of a different cutting pattern.

The body frame 100 comprises a generally planar, flat cylindrical (circular) plastic ring 110 that defines an aperture 111 therein, with the cutter 200 located within the aperture 111. A pair of handles or handgrips 120 is connected to opposite sides of the ring 110 by respective integral arms 121 which extend at about 45° upwardly apart, such that the body frame 100 and hence also the cutter 200 therein may conveniently and firmly be held by the two hands of a person using the tool.

The cutter 200 is formed by a generally planar, flat cylindrical (circular) plastic ring 210 and a set of nine stainless steel cutting blades 220 that are surrounded by, and fixed to, the ring 210. This ring 210 is marginally smaller than the ring 110 of the body frame 100, for fitting within the latter's aperture 111 in a co-planar arrangement, together lying in generally the same horizontal imaginary plane.

The cutting blades 220 extend across the ring 210 (and hence the aperture 111) in a generally radial lattice pattern, with eight of them extending radially and the remaining one as a small circle at the centre. The blades 220 face, with their cutting edges, in substantially the same direction vertically downwards for cutting an apple downwardly into eight slices around the core. As the apple is being cut by the lowering cutter 200, the apple slices and core being cut out pass relatively upwardly through the ring 210 (and hence the aperture 111) past the blades 220.

The cutter 200 is secured within the body frame 100 by means of a pair of bayonet joints 300 provided between their rings 210 and 110 on opposite left and right sides thereof.

Each bayonet joint 300 consists of two co-operating parts or engaging formations implemented by an inverted L-shaped slot 310 in the inner surface of the outer frame ring 110 and an adjacent flat rectangular protrusion 320 on the outer surface of the inner cutter ring 210, with the protrusion 320 fitting in and engages the slot 310 through a bayonet joint action.

Each of the slots 310 has a vertically downward open end for receiving the corresponding protrusion 320 as the cutter 200 is being inserted from below into the ring 110 of the body frame 100. The cutter 200 is subsequently rotated through a small angle horizontally to turn the protrusions 320 into the horizontal sections of the L-shaped slots 310, whereby the cutter 200 is connected to and attached within the body frame 100, together resulting in a unitary structure for cutting operation.

The cutter ring 210 has, integrally on its lower side, an annular flange 211 for covering the annular gap between the two rings 110 and 210. More importantly, the flange 211 serves to provide a 360° all-round perimetrical engagement for the body frame ring 110 upon the cutter ring 210 as the body frame 100 pushes the cutter 200 to cut. This avoids over-straining the bayonet joints 300.

A pair of left and right buttons 212 is formed on the flange 211, each at a position in front of the respective protrusion 320 and spaced apart from the wall of the ring 210, to facilitate holding of the cutter 200 by the thumb and index finger of the user. The buttons 212 are located off the wall of the ring 210 to leave room, i.e. a gap G therebetween, for the frame ring 110 as the cutter 200 is inserted into the body frame 100.

In the gap G, on the inner surface of each of the buttons 212 there is a small bump 213 facing the ring 210. A small slot or dent 113 is formed in the outer surface of the ring 110 of the body frame 100, at a position aligned with each bump 213.

The bumps 213 and the dents 113 releasably inter-engage, through a slight snap action, as the cutter 200 is properly connected with the body frame 100 upon completion of the bayonet joints 300. Each pair of the bump 213 and dent 113 acts as a catch to hold the cutter 200 against rotating back relative to the body frame 100, thereby maintaining the bayonet joints 300. The catches can be overcome if the cutter 200 is rotated back with a sufficient force (i.e. intentionally), so that the cutter 200 can be detached from the body frame 100.

As mentioned above, there are two or more cutters 200 for selective use with the body frame 100, whose cutting blades 220 are arranged in different lattice patterns for cutting in different manners, for example different numbers of slices. These cutters 200 have generally the same structure and size, including a pair of protrusions 320 for bayonet connection, for interchangeable use with the body frame 100.

With the availability of interchangeable cutters 200, the apple slicer 10, or the food cutting device generally of the subject invention, offers a variety of cutting patterns, or types of cutting blades, for selective use as desired. This is advantageous for use, as well as for storage/packaging because the cutters 200 are flat and can therefore be packed close together, whereas several whole dividers (each with an irremovable cutter) together are not space efficient, partly due to their handles. Saving of material is of course another advantage.

It is envisaged that the food cutting device of the subject invention can be designed or used to cut or slice food of any other kinds. An example is potato, for which the cutter may incorporate cutting blades arranged in a checker pattern for cutting out strips to make French fries. A series of parallel cutting blades is suitable for cutting onion into rings.

It is further envisaged that the cutter of the subject invention may not be of the lattice type as described above. As an example, there may only be one single blade which is looped and bent in a certain shape and sticks out downwardly for cutting cookies or pastry.

It is to be understood that any part of the body frame of the subject invention may serve as a handle or handgrip, and the design or shape of such a handle/handgrip is practically unlimited, such as an inverted U-shaped bar or an annular ring atop or a cylindrical upward extension of the body frame.

The invention has been given by way of example only, and various other modifications of and/or alterations to the described embodiment may be made by persons skilled in the art without departing from the scope of the invention as specified in the appended claims.

The invention claimed is:

1. A food cutting device comprising:
   a frame including a wall defining, within the wall, a circular aperture having a central axis aligned with a cutting direction of the food cutting device,
   first and second L-shaped slots in the wall, each of the first and second L-shaped slots including a first portion that is parallel to the axis and extends to an edge of the wall, and a second portion that is transverse to the axis, and
   first and second linear recesses in the wall, parallel to the axis; and a cutter including
   a circular cutter ring having a wall with an outside surface, the cutter ring being removably locatable within the aperture of the frame,
   a plurality of cutting blades surrounded by and fixed to the cutter ring,
   first and second protrusions on the outside surface of the wall of the cutter ring and receivable in the second portions of the first and second L-shaped slots, respectively, to engage the frame to the cutter ring and prevent separation of the cutter ring from the frame in response to forces applied to the along the axis to the frame and the cutter ring,
   a peripheral flange transverse to the axis and extending outwardly from a lower edge of the cutter ring, and
   first and second buttons mounted on the peripheral flange and outwardly spaced from the outside surface of the wall of the cutter ring, for handling of the cutter, each of the first and second buttons including a projecting bump facing the outside surface of the wall of the cutter ring, wherein
   the peripheral flange covers any gap between the wall of the frame and the wall of the cutter ring when the cutter ring is engaged with the frame, and
   the first and second buttons releasably engage the first and second linear recesses in the frame when the first and second protrusions are engaged in the second portions of the first and second L-shaped slots, respectively, to resist rotation of the cutter ring, relative to the frame about the axis.

2. The food cutting device as claimed in claim 1, wherein when the frame and the cutter are engaged with each other, at least some of the cutting blades extend across the aperture of the frame and face the cutting direction for cutting food the food being cut passing through the aperture in a direction opposite the cutting direction.

3. The food cutting device as claimed in claim 2, wherein the frame and the cutter ring lie in a common plane, perpendicular to the cutting direction, when the frame and cutter ring are engaged with each other.

4. The food cutting device as claimed in claim 2, wherein the cutter ring is inserted into the aperture of the frame in the direction opposite the cutting direction to engage the cutter ring with the frame.

5. The food cutting device as claimed in claim 1, wherein the frame includes first and second handles located on the frame.

6. The food cutting device as claimed in claim 1, including at least two cutters which have the same size and are removably locatable within the aperture of the frame, wherein the cutting blades of the at least two cutters are arranged in respective, different patterns.

7. The food cutting device according to claim 1, wherein the recesses comprise slots in the wall of the frame.

8. The food cutting device according to claim 1, wherein the recesses comprise dents in the wall of the frame.

* * * * *